No. 792,023. PATENTED JUNE 13, 1905.
C. H. HAESELER.
DRILL.
APPLICATION FILED JAN. 6, 1905.

WITNESSES:
H. H. Canby.
M. F. Ellis

INVENTOR
Charles H. Haeseler
BY
Harding & Harding
ATTORNEYS

No. 792,023.

Patented June 13, 1905.

UNITED STATES PATENT OFFICE.

CHARLES H. HAESELER, OF PHILADELPHIA, PENNSYLVANIA, ASSIGNOR TO THE INGERSOLL-SERGEANT DRILL COMPANY, OF NEW YORK, N. Y., A CORPORATION OF WEST VIRGINIA.

DRILL.

SPECIFICATION forming part of Letters Patent No. 792,023, dated June 13, 1905.

Application filed January 6, 1905. Serial No. 239,957.

*To all whom it may concern:*

Be it known that I, CHARLES H. HAESELER, a citizen of the United States, residing at Philadelphia, county of Philadelphia, and State of Pennsylvania, have invented a new and useful Improvement in Drills, of which the following is a full, clear, and exact description, reference being had to the accompanying drawings, which form a part of this specification.

My invention relates to hammer-drills and feeders, and has for its object to so construct the machine as to enable the operator to manipulate and control it with more convenience and certainty than has been heretofore possible.

Another object of the invention is to simplify the construction of the machine by controlling the feeding and drilling operation from a single continuous air-duct.

Figure 1:
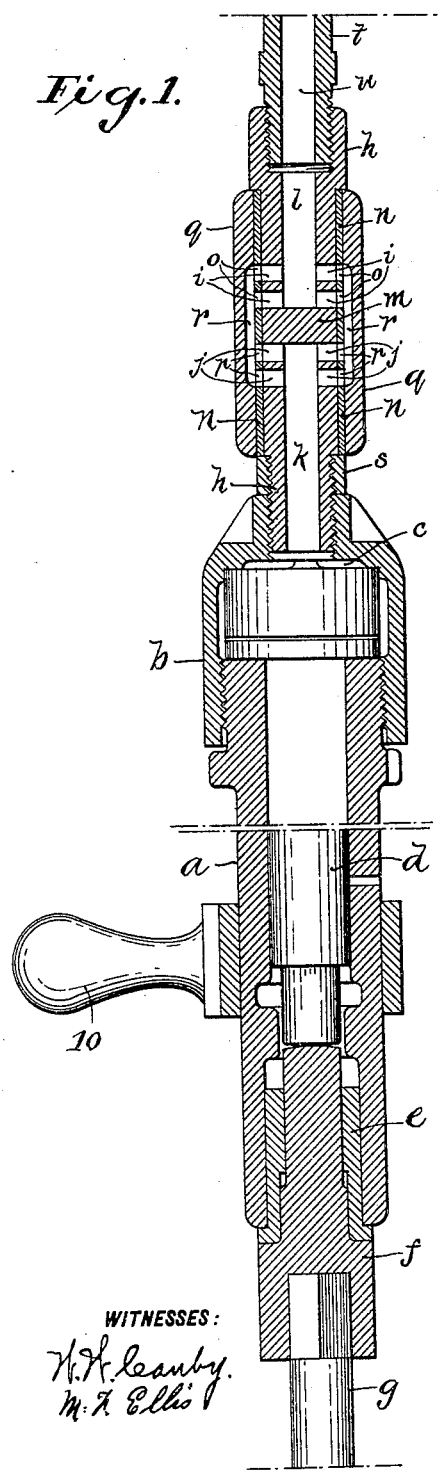
Figure 1A:
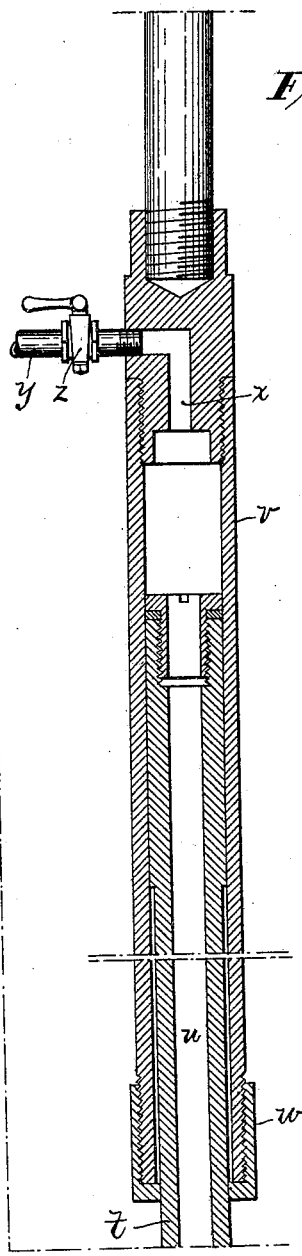

In the drawings, Figure 1 is a sectional view of the front portion of a hammer-drill and feeder embodying my invention. Fig. 1ª is a similar view of the rear portion of the same, the dot-and-dash line showing the connection between the upper end of Fig. 1 and the lower end of Fig. 1ª.

$a$ is the body of the drill-cylinder, having an externally-threaded rear end; $b$, the head-block of the cylinder, having an internally-threaded front end engaging the thread on the body of the cylinder.

$c$ is the valve-chamber, confined between the rear end of the body of the cylinder and the head-block.

$d$ is the hammer-piston within the drill-cylinder.

$e$ is a bushing shrunk in the front end of the cylinder; $f$, a chuck having a polygonal upper end inserted in a similarly-shaped seat in the bushing, and $g$ the bit, chisel, or other working tool held in the chuck.

10 is a handle secured to the drill-cylinder.

In a threaded annular flange at the rear end of the head-block is inserted the threaded front end of the stem $h$ of a throttle-valve. This stem is provided with passage $k\,l$, extending longitudinally therein on the line of its axis.

$m$ is an abutment placed centrally of the stem $h$ and separating the part $k$ of the passage from the part $l$ thereof.

$i\,j$ are orifices extending radially through the walls of the stem, the orifices $i$ being on one side of the abutment and the orifices $j$ on the other side thereof.

$n$ is a ring, preferably of brass, surrounding the stem $k$. The ring is provided with orifices $o\,p$ corresponding to the orifices $i\,j$.

$q$ is a sleeve to which the ring is secured, the sleeve being provided with an annular groove $r$ in its central portion of a length equal to the extreme length of the orificed portions of the stem $h$ and ring $n$.

The ring $n$ and sleeve $q$ are confined between the rear head of the stem $h$ and a nut $s$ on the threaded front end of the stem $h$, this nut abutting against the flanged rear end of the head-block.

The stem $h$, ring $n$, and sleeve $q$ constitute a throttle-valve, by means of which the motive fluid is admitted to the working tool, the sleeve and ring being capable of turning on the stem $h$, so as to bring the orifices $o\,p$ into or out of alinement with the orifices $i\,j$. This throttle-valve forms, in effect, the rear end of the hammer-drill.

$t$ is the feed-piston, having a threaded front end engaging the threaded end of the head of the stem. The feed-piston is provided with a passage $u$, extending therethrough on the line of its axis.

$v$ is the feed-cylinder, in which the feed-piston works.

$w$ is a feed-chuck threaded on the front end of the cylinder and through which the feed-piston moves.

$x$ is a passage formed in the head of the feed-cylinder, said passage extending from the interior of the cylinder to the outside thereof.

$y$ is a feed-pipe communicating with said passage.

$z$ is a throttle-valve on the feed-pipe.

The drill and feeder so constructed operates as follows: The machine is first placed in working position with the bit at the point at which it is desired to drill the hole. The sleeve $q$ has been turned so as to bring the orifices $i$ $j$ out of alinement with the orifices $o$ $p$. The feed-cylinder $v$ is held immovably by any usual means, such as by abutting the head of the feed-cylinder against a stationary frame or securing the body of the cylinder to a stationary frame. The throttle-valve $z$ is then opened, and the compressed air or other motive fluid passes from the feed-tube $y$ and passage $x$ to the pressure-chamber in the rear of the feed-piston and thence passes through the passage $u$ in the feed-piston $t$ into the passage $l$ in the stem $h$ of the throttle-valve. The motive fluid acting against the head of the feed-piston and the abutment $m$ of the throttle-valve advances the feed-piston, throttle-valve, and drill until the bit is held firmly against the rock. The operator then turns the sleeve $h$ and ring $n$ until the orifices $i$ $j$ and $o$ $p$ coincide, whereupon the motive fluid passes from passage $l$ successively through orifices $j$ and $p$, groove $r$, orifices $o$ and $i$, and passage $k$ to the interior of the drill, thereby causing the striking-piston to reciprocate and deliver blows upon the end of the drill-chuck. As the striking-piston reciprocates the operator grasps the handle 10 and turns the same, thereby turning the drill-cylinder and bit so as to cause the bit to constantly strike the rock at different angles in the manner well known in rock-drills. As the drilling proceeds the motive fluid acting upon the feed-piston and abutment $m$ moves the feed-piston and hammer-drill forwardly, so as to constantly hold the drill-bit to its work. The operator may shut off the motive fluid from the hammer-drill at any time by simply turning the sleeve $h$. At the end of the drilling operation the sleeve $h$ is turned to cut off the supply of motive fluid to the drill, and then the valve $z$ is closed to cut off the supply of motive fluid to the feed-cylinder, thereby permitting the drill to be withdrawn.

I have not described the internal construction of the drill-cylinder, including the construction of the valve and arrangement of air-passages in the valve and cylinder, as the same form no part of my invention, the particular construction of the hammer-drill being unimportant.

Having now fully described my invention, what I claim, and desire to protect by Letters Patent, is—

1. In a combined hammer-drill and feeder, the combination, with the feed cylinder and piston, of the hammer-drill secured to the feed-piston, said feed-cylinder having a continuous passage extending from the source of motive-fluid supply to the interior of the hammer-drill and including the pressure area back of the feed-piston, a throttle-valve between said pressure area and the hammer-drill for controlling the hammer-drill and a throttle-valve back of said pressure area for controlling the feed-piston, substantially as described.

2. In a combined hammer-drill and feeder, the combination with the feed cylinder and piston, the piston having a passage extending longitudinally therethrough, of the hammer-drill, secured at its rear end to the feed-piston, and having a passage therein communicating with the passage in the piston, and a throttle-valve for regulating the flow of motive fluid from the hollow piston to the interior of the hammer-drill, substantially as described.

3. In a combined hammer-drill and feeder, the combination, with the feed-cylinder, of a piston working therein having a passage extending longitudinally therethrough, a throttle-valve stem secured thereto and a passage extending longitudinally therethrough, the cylinder of the hammer-drill secured to the throttle-valve stem, and a throttle-valve sleeve on the throttle-valve stem for controlling the passage of motive fluid from the interior of the hollow piston to the interior of the hammer-drill, substantially as described.

4. In a combined hammer-drill and feeder, the combination with the feed-cylinder, of a piston working therein having a passage extending longitudinally therethrough, a throttle-valve stem secured thereto and having a passage extending longitudinally therethrough, the cylinder of the hammer-drill secured to the throttle-valve stem, an abutment in the throttle-valve stem dividing the passage therein, orifices in the walls of the stem on both sides of said abutment, a sleeve turnable on said stem provided with a passage-way, and a ring secured to said sleeve and having orifices corresponding to the orifices in the stem and located opposite said passage-way, substantially as described.

5. In a combined hammer-drill and feeder, the combination with the drill-cylinder and working tool connected thereto, of the feed-cylinder, the feed-piston, a throttle-valve stem secured to the rear end of the cylinder and to the feed-piston, said feed-cylinder having a continuous passage extending from the source of fluid-supply to the valve-stem and including the pressure area back of the feed-piston, a valve-sleeve turnable on the valve-stem and adapted to be grasped and turned by one hand of the operator to control the admission of motive fluid to the interior of the drill, and a handle connected with the drill and adapted to be grasped by the other hand of the operator to turn the working tool during its operation, substantially as described.

6. In a combined hammer-drill and feeder, the combination with the drill-cylinder and working tool connected thereto so as to rotate therewith, of the feed-cylinder, the feed-piston, a throttle-valve stem secured at one end to the piston, and at the other end to the cylinder, said feed-cylinder having a continuous passage extending from the source of fluid-supply to the valve-stem and including the pressure area back of the feed-piston, a valve-sleeve turnable on the valve-stem and adapted to be grasped and turned by one hand of the operator to control the admission of motive fluid to the interior of the drill, and a handle secured to the cylinder and adapted to be grasped by the other hand of the operator to turn the drill during its operation, substantially as described.

7. In a combined hammer-drill and feeder, the combination with the drill-cylinder and working tool connected thereto, of a throttle-valve stem secured to the rear end of the cylinder, a feed-piston secured to the rear end of the valve-stem, a feed-cylinder in which said feed-piston works, a valve-sleeve turnable on the valve-stem and adapted to be grasped by one hand of the operator to control the admission of motive fluid to the interior of the drill and a handle connected with the drill and adapted to be grasped by the other hand of the operator to turn the working tool during its operation, substantially as described.

8. In a combined hammer-drill and feeder, the combination with the drill-cylinder and working tool connected thereto so as to rotate therewith, of a throttle-valve stem secured to the rear end of the cylinder, a feed-piston secured to the rear end of the valve-stem, a feed-cylinder in which said feed-piston works, a valve-sleeve turnable on the valve-stem and adapted to be grasped by one hand of the operator to control the admission of motive fluid to the interior of the drill, and a handle secured to the cylinder and adapted to be grasped by the other hand of the operator to turn the hammer-cylinder, working tool, throttle-valve and feed-piston during the operation of the drill, substantially as described.

9. In a combined hammer-drill and feeder, the combination with the drill-cylinder and working tool connected thereto, of a throttle-valve stem secured to the rear end of the cylinder, a feed-piston secured to the rear end of the valve-stem, a feed-cylinder having a pressure-chamber back of the feed-piston, means to admit motive fluid to said pressure-chamber, a continuous passage extending from said pressure-chamber through said feed-piston and valve-stem to the interior of the hammer-drill, a valve-sleeve turnable on the valve-stem and adapted to be grasped by one hand of the operator to open and close the passage through the valve-stem, and a handle connected with the drill and adapted to be grasped by the other hand of the operator to turn the working tool during its operation, substantially as described.

10. In a combined hammer-drill and feeder, the combination with the drill-cylinder and working tool connected thereto so as to rotate therewith, of a throttle-valve stem secured to the rear end of the cylinder, a feed-piston secured to the rear end of the valve-stem, a feed-cylinder having a pressure-chamber back of the feed-piston, means to admit motive fluid to said pressure-chamber, a continuous passage extending from said pressure-chamber through said feed-piston and valve-stem to the interior of the hammer-drill, a valve-sleeve turnable on the valve-stem and adapted to be grasped by one hand of the operator to open and close the passage through the valve-stem, and a handle secured to the cylinder and adapted to be grasped by the other hand of the operator to turn the hammer-cylinder, working tool, throttle-valve, and feed-piston during the operation of the drill, substantially as described.

11. In a combined hammer-drill and feeder, the combination with the drill, of the feed-piston secured thereto, the feed-cylinder having a pressure-chamber back of the feed-piston, means to admit motive fluid to said pressure-chamber, a continuous passage extending from said pressure-chamber to the interior of the hammer-drill, a throttle-valve interposed in said passage and adapted to be grasped by one hand of the operator, and a handle connected with the drill and adapted to be grasped by the other hand of the operator to turn the working tool during its operation, substantially as described.

12. In a combined hammer-drill and feeder, the combination with the drill-cylinder and working tool connected thereto so as to rotate therewith, of the feed-piston connected with the drill-cylinder so as to turn therewith, the feed-cylinder having a pressure-chamber back of the feed-piston, means to admit motive fluid to said pressure-chamber, a passage extending from said pressure-chamber through said piston to the drill-cylinder, a throttle-valve interposed in said passage and adapted to be grasped by one hand of the operator, and a handle secured to the drill-cylinder and adapted to be grasped by the other hand of operator to turn the working tool during its operation, substantially as described.

13. In a combined hammer-drill and feeder, the combination with the drill, of the feed-piston secured thereto, the feed-cylinder having a pressure-chamber back of the feed-piston, means to admit motive fluid to said pressure-chamber, a continuous passage extending from said pressure-chamber to the interior of the hammer-drill, a throttle-valve for controlling the admission of motive fluid to the interior of the drill and adapted to be grasped by one hand of the operator, and a handle connected with the drill and adapted to be grasped by the other hand of the operator to turn the working tool during its operation, substantially as described.

14. In a combined hammer-drill and feeder, the combination, with the drill-cylinder and working tool connected thereto so as to rotate therewith, of the feed-piston connected with the drill-cylinder so as to turn therewith, the feed-cylinder having a pressure-chamber back of the feed-piston, means to admit motive fluid to said pressure-chamber, a passage extending from said pressure-chamber through said piston to the drill-cylinder, a throttle-valve for controlling the admission of motive fluid to the interior of the drill-cylinder and adapted to be grasped by one hand of the operator, and a handle secured to the drill-cylinder and adapted to be grasped by the other hand of the operator to turn the working tool during its operation, substantially as described.

15. In a combined hammer-drill and feeder, the combination with the hammer-drill, of the feed-piston connected therewith, the feed-cylinder having a pressure-chamber back of the feed-piston, a throttle-valve for controlling the admission of motive fluid to the interior of the drill, a continuous passage from the source of motive-fluid supply including the pressure-chamber and throttle-valve, and a second throttle-valve in said passage back of the pressure-chamber, substantially as described.

16. In a combined hammer-drill and feeder, the combination with the hammer-drill, of the feed-piston connected therewith, the feed-cylinder having a pressure-chamber back of the feed-piston, a throttle-valve for controlling the admission of motive fluid to the interior of the drill, a handle secured to the hammer-drill to turn the working tool thereof, a continuous passage from the source of motive supply including the pressure-chamber and throttle-valve, and a second throttle-valve in said passage back of the pressure-chamber, substantially as described.

In testimony of which invention I have hereunto set my hand, at New York, on this 4th day of January, 1905.

CHARLES H. HAESELER.

Witnesses:
R. D. PARCREE,
E. L. DAVIS.